May 21, 1957     R. C. SINCLAIR     2,792,663
FISHHOOK

Filed Aug. 6, 1954

INVENTOR.
Robert C. Sinclair
BY ent Office 2,792,663
Patented May 21, 1957

2,792,663
FISH HOOK

Robert C. Sinclair, Hampton, Va.

Application August 6, 1954, Serial No. 448,291

1 Claim. (Cl. 43—43.15)

The invention relates to new and useful improvements in a fish hook having a shank and an offset barb at one end thereof and an associated float or buoyant member.

An object of the invention is to provide a hook of the above type with an elongated shank on which is mounted an elongated float.

A further object of the invention is to provide a hook and float of the above type wherein the float has a bore extending from end to end thereof through which the shank of the hook passes and along which shank the float may be shifted to different set positions.

A still further object of the invention is to provide a hook and float in which the shank of the hook is provided with oppositely disposed laterally curved or bent sections merging into one another and dimensioned so that three or more sections grip the wall of the bore and hold the float in a set position.

In the drawings which show by way of illustration one embodiment of the invention:

Figure 1:
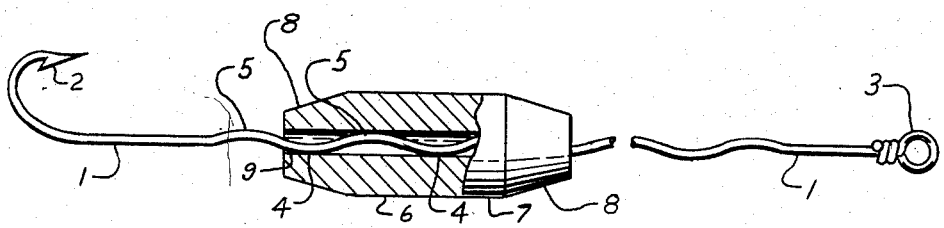
Figure 1 is a view in side elevation of the barbed hook and elongated shank with the elongated float partly in section and in a set position thereon.

Referring more in detail to the drawings, the hook has a shank portion 1 with a barb 2. The shank is elongated and is provided with an eye 3 at its outer end. The shank between the barbed end and the eye is bent or curved laterally at spaced points indicated at 4, 4 and 5, 5. The bent portions 5 extend laterally in opposite directions from the bent portions 4. These laterally curved or bent portions merge one into another. Mounted on the shank is the float or buoyant member 6 which may be made of cork, wood or any other suitable buoyant material. This float is elongated and has a cylindrical portion 7 with tapered ends 8, 8. Extending centrally through the float is a bore 9. The bent portions of the hook are dimensioned so that there will be at least three bent portions within the bore of the float at the same time. These bent portions are dimensioned relative to the diameter of the bore so that the high points or extreme points of the laterally bent sections grip the wall of the bore and will hold the float in a set position on the shank of the hook.

Figure 2:
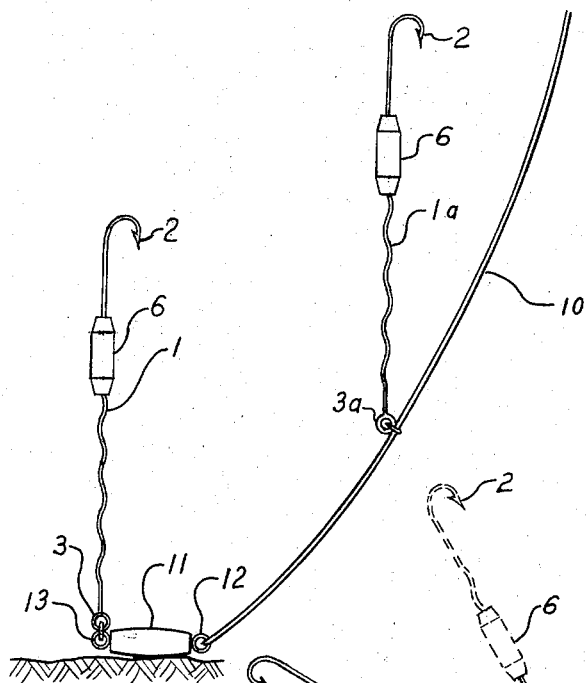
Figure 2 is an elevational view showing the improved hook and associated float and the position thereof relative to a sinker with the float set on the shank near the barbed end of the hook for still fishing.

In Figure 2 there is illustrated a line 10 which is connected to a sinker 11 at the end 12 thereof. Attached to the other end 13 of the sinker is the eye 3 of the shank 1 of the hook. When the float is placed on the shank adjacent the barb of the hook as used in still fishing the hook will take the position shown in Figure 2. That is, the hook will extend upwardly from the sinker in a substantially vertical position. This is of great advantage in still fishing where there are weeds and the like. The sinker will descend to the bottom or nearly so but the hook will stand up free from the weeds. In this figure there is shown a second hook 1ᵃ, having an eye 3ᵃ of which is attached to the line 10. This connection is located between the sinker and the fisherman.

Figure 3:
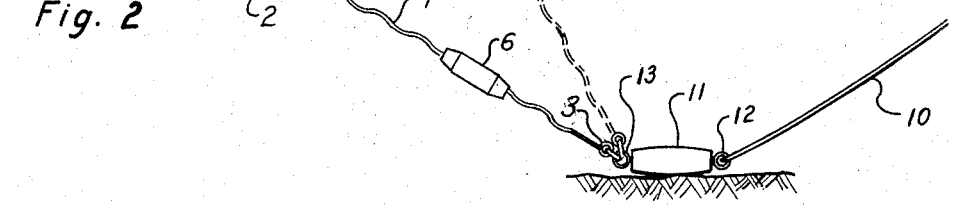
Figure 3 is a view similar to Figure 2 showing in full lines the position of the hook relative to the sinker in trolling and with the float midway between the barb and sinker and in dotted lines the position of the hook with the float shifted to a position nearer the barb.

In Figure 3 there is shown the line 10 attached to a sinker 11 at 12 and a hook attached to the sinker at the end 13 thereof. During trolling when the sinker is moving along the bottom, the float, when positioned midway between the barb and the eye of the hook, will take the position shown in full lines in Figure 3. If the float is adjusted to a point nearer the barb then the hook will take the position shown in dotted lines in Figure 3. It is noted that the hook has an elongated rigid shank which shank is pivotally attached to the sinker. The weight and length of the hook and shank and the buoyant force of the float is such that the angle which the shank of the hook makes with the horizontal may be varied from 0° to 90° by the position which the float is set along said shank.

It is obvious that changes may be made in the arrangement of the hook relative to the line and the sinker and also in the details of construction without departing from the spirit of the invention as set forth in the appended claim.

I claim:

The combination of a fish hook having a smooth straight shank portion of normal length and merging at one end into a conventional barbed hook and at its other end into an extension several times the length of said straight shank portion, said shank terminating in an eye and having therein a plurality of long smooth and resilient undulations and an elongated float slidable along the shank extension, having a length for extending over a plurality of the undulations and having a bore therein dimensioned to tightly frictionally grip the undulations and securely hold the float in a selected position of adjustment along said extension, a sinker having means for connection with a line and pivotally connected to the hook extension eye and adapted during active fishing to rest on a water bottom, the weight and length of the hook and shank extension and the buoyancy of the float being such that the angle of said shank extension with relation to said bottom and said pivotal connection may be varied according to the selected placement of the float along the shank extension undulations.

References Cited in the file of this patent

UNITED STATES PATENTS

| 1,156,152 | Krenrick | Oct. 12, 1915 |
| 1,345,173 | Halder | June 29, 1920 |
| 1,961,539 | White | June 5, 1934 |
| 1,991,253 | Kerns | Feb. 12, 1935 |
| 2,233,338 | Brewer | Feb. 25, 1941 |
| 2,543,293 | Leitch et al. | Feb. 27, 1951 |
| 2,594,620 | Braithwaite | Apr. 29, 1952 |

FOREIGN PATENTS

| 19,442 | Great Britain | 1892 |
| 26,041 | Great Britain | 1932 |
| 350,820 | Great Britain | June 18, 1931 |